United States Patent [19]
Kahle et al.

[11] Patent Number: 5,764,942
[45] Date of Patent: Jun. 9, 1998

[54] METHOD AND SYSTEM FOR SELECTIVE SERIALIZATION OF INSTRUCTION PROCESSING IN A SUPERSCALAR PROCESSOR SYSTEM

[75] Inventors: James Allan Kahle; Chin-Cheng Kau, both of Austin; Aubrey Deene Ogden, Round Rock; Ali Asghar Poursepanj; Paul Kang-Guo Tu, both of Austin; Donald Emil Waldecker, Round Rock, all of Tex.

[73] Assignee: International Business Machines Corporation, Armonk, N.Y.

[21] Appl. No.: 689,437

[22] Filed: Aug. 12, 1996

Related U.S. Application Data

[63] Continuation of Ser. No. 1,865, Jan. 8, 1993.
[51] Int. Cl.[6] .................... G06F 9/30; G06F 9/312
[52] U.S. Cl. .............. 395/390; 395/392; 395/566; 395/570
[58] Field of Search ................ 395/390, 392, 395/566, 570

[56] References Cited

U.S. PATENT DOCUMENTS 5,471,593  11/1995  Branigin ................... 395/24

OTHER PUBLICATIONS

Dwyer III, Harry, A Multiple, Out-of-Order, Instruction Issuing System for Superscalar Processors, Cornell University, Aug. 1991.

*Primary Examiner*—William M. Treat
*Attorney, Agent, or Firm*—Casimer K. Salys; Daniel E. Venglarik; Andrew J. Dillon

[57] ABSTRACT

The method and system of the present invention permits enhanced instruction dispatch efficiency in a superscalar processor system capable of fetching an application specified ordered sequence of scalar instructions and simultaneously dispatching a group of the scalar instructions to a plurality of execution units on a nonsequential opportunistic basis. A group of scalar instructions fetched in an application specified ordered sequence on a nonsequential opportunistic basis is processed in the present invention. The present invention detects conditions requiring serialization during the processing. In response to a detection of a condition requiring serialization, processing of particular scalar instructions from the group of scalar instructions are selectively controlled, wherein at least a portion of the scalar instructions within the group of scalar instructions are thereafter processed in a serial fashion.

8 Claims, 9 Drawing Sheets

METHOD AND SYSTEM FOR SELECTIVE SERIALIZATION OF INSTRUCTION PROCESSING IN A SUPERSCALAR PROCESSOR SYSTEM

This is a Continuation of application Ser. No. 08/001,865, filed Jan. 8, 1993.

CROSS-REFERENCE TO RELATED APPLICATION

The present application is related to U.S. Pat. No. 5,465,373, entitled "Method and System for Single Cycle Dispatch of Multiple Instructions in a Superscalar Processor System," U.S. Pat. No. 5,491,829, entitled "Method and System for Indexing the Assignment of Intermediate Storage Buffers in a Superscalar Processor System," U.S. patent application Ser. No. 08/001,890, abandoned in favor of FWC 08/255,130, entitled "Method and System for Nonsequential Instruction Dispatch and Execution in a Superscalar Processor System," and U.S. patent application Ser. No. 08/001,866, now abandoned, entitled "Method and System for Tracking Scalar Instructions Within a Superscalar Processor System," all filed of even date herewith by the inventors hereof and assigned to the assignee herein, and incorporated by reference herein.

BACKGROUND OF THE INVENTION

1. Technical Field

The present invention relates in general to an improved data processing system and in particular to a method and system for enhanced instruction processing efficiency in a superscalar processor system. Still more particularly, the present invention relates to a method and system for selective serialization of instruction processing in a superscalar processor system.

2. Description of the Related Art

Designers of modern state-of-the-art data processing systems are continually attempting to enhance performance aspects of such systems. One technique for enhancing data processing efficiency is the achievement of short cycle times and a low Cycles-Per-Instruction (CPI) ratio. An excellent example of the application of these techniques to an enhanced data processing system is the International Business Machines Corporation RISC System/6000 (RS/6000) computer. The RS/6000 system is designed to perform well in numerically intensive engineering and scientific applications as well as in multi-user, commercial environments. The RS/6000 processor employs a superscalar implementation, which means that multiple instructions are issued and executed simultaneously.

The simultaneous issuance and execution of multiple instructions requires independent functional units that can execute concurrently with a high instruction bandwidth. The RS/6000 system achieves this by utilizing separate branch, fixed point and floating point processing units which are pipelined in nature. In view of the pipelined nature of the processors in such systems care must be taken to ensure that a result from a particular instruction which is necessary for execution of a subsequent instruction is obtained prior to dispatching the subsequent instruction. One technique for ensuring that such so-called "data dependency hazards" do not occur is the restriction of the dispatching of a particular instruction until such time as all preceding instructions have been dispatched. While this technique ensures that data dependency hazards will not occur, the performance penalty encountered utilizing this technique is substantial.

As a consequence, modern superscalar data processing systems often utilize a so-called "data dependency interlock circuit." Such circuits contain logic which operates in concert with instruction dispatch circuitry to ensure that an instruction is not dispatched until such time as a result from a preceding instruction which is necessary for correct execution of that instruction has been obtained. The amount of logic required to implement a data dependency interlock circuit is directly proportional to the number of source operands within each instruction. A source operand is a field within an instruction which is utilized to access an operand within a register file, for utilization in execution of that instruction.

While data dependency interlock circuits permit data dependency hazards to be avoided without encountering the substantial performance penalty described above, the design and implementation of data dependency interlock circuits for instructions which include larger numbers of source and destination operands becomes quite complex. The dependency interlocks inhibit dispatch of dependent instructions which prevents following instructions, which may be independent and executable, from entering the dispatcher to be dispatched and executed.

The data dependency hazards which occur with the simultaneous executing of multiple instructions in each processor cycle have also been addressed by utilizing an approach known as "register renaming." Register renaming is a technique utilized to temporarily place the results of a particular instruction into a register for potential use by later instructions prior to the time the final result from an instruction is placed within a register file. Register renaming is generally accomplished by providing a register file array with extra locations and a pointer arrangement to identify particular physical registers which have been assigned to logical registers. Selected prior art approaches also utilize multiple register file arrays to provide many "read" ports for data or for holding previous results for backup in the case of exceptions.

While this technique provides the ability to simultaneously dispatch and execute multiple instructions where serial execution might otherwise be necessary, a problem exists with the dispatching of instructions to execution units utilizing such techniques. The requirement that an instruction utilize particular data or operands for execution has generally rendered it impossible to dispatch an instruction and associated data to an execution unit within a single processor cycle, since the dispatch unit, or the execution unit must generally perform a complex read through a lookup table or pointer system to determine when temporary register contains the required data for execution of the instruction.

Situations exist in which instructions cannot be executed out of order or incorrect program results may be generated. Such instructions must be processed in a serial or sequential fashion also called "serialization". Serialization ensures that the execution of these instructions follow any required rules.

It should therefore be apparent that a need exists for a method and system that prevents out of order execution of selected instructions in a superscalar processor system.

SUMMARY OF THE INVENTION

It is therefore one object of the present invention to provide an improved data processing system.

It is another object of the present invention to provide an improved method and system for enhanced instruction processing efficiency in a superscalar processor system.

It is yet another object of the present invention to provide an improved method and system for selective serialization of instruction processing in a superscalar processor system.

The foregoing objects are achieved as is now described. The method and system of the present invention permits enhanced instruction dispatch efficiency in a superscalar processor system capable of fetching an application specified ordered sequence of scalar instructions and simultaneously dispatching a group of the scalar instructions to a plurality of execution units on a nonsequential opportunistic basis. A group of scalar instructions fetched in an application specified ordered sequence on a nonsequential opportunistic basis is processed in the present invention. The present invention detects conditions requiring serialization during the processing. In response to a detection of a condition requiring serialization, processing of particular scalar instructions from the group of scalar instructions are selectively controlled, wherein at least a portion of the scalar instructions within the group of scalar instructions are thereafter processed in a serial fashion.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
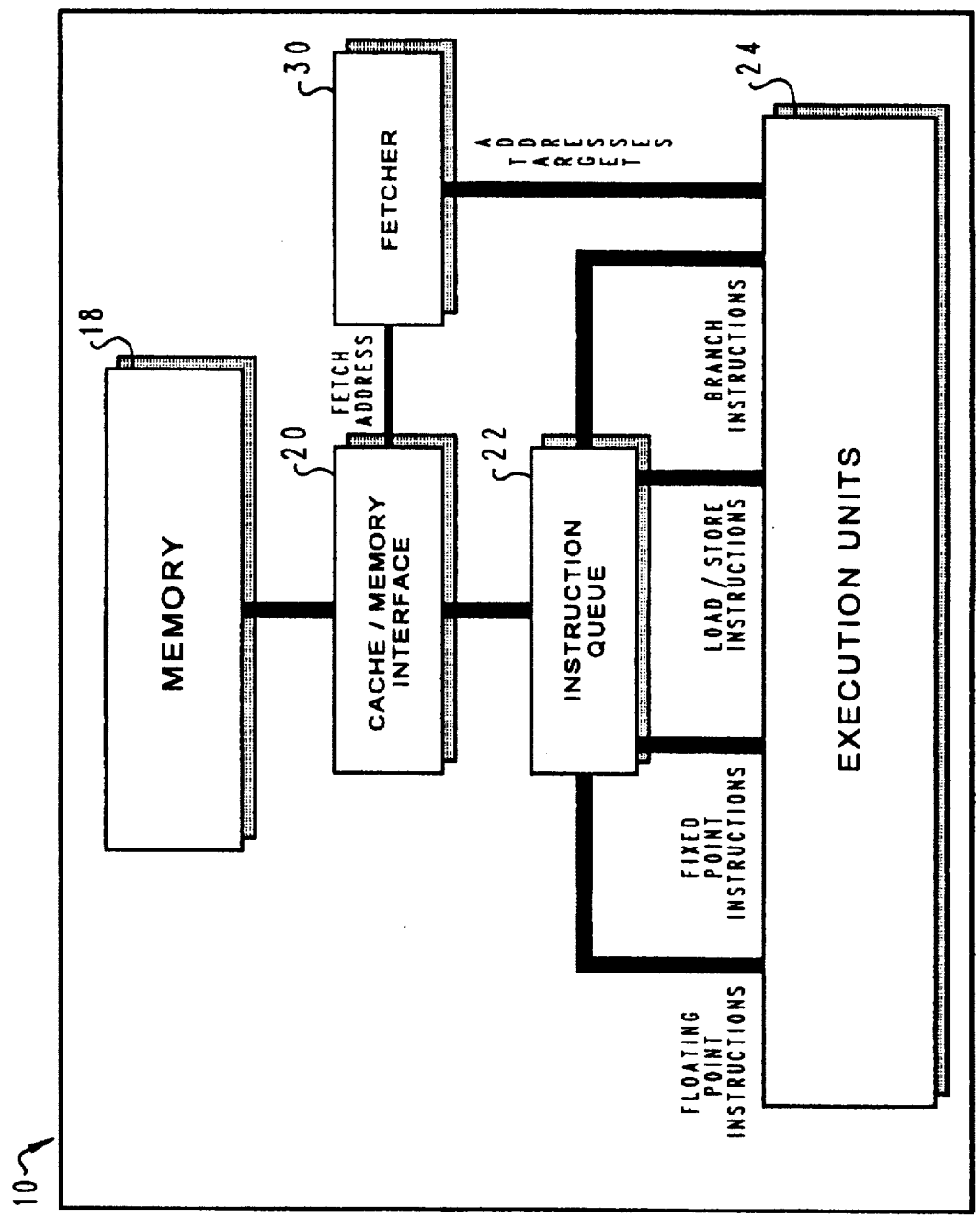
FIG. 1 is a high level block diagram of superscalar data processing system which may be utilized to implement the method and system of the present invention.

With reference now to the figures and in particular with reference to FIG. 1, there is depicted a high level block diagram of a superscalar data processing system 10 which may be utilized to implement the method and system of the present invention. As illustrated, data processing system 10 includes a memory 18 which is utilized to store data, instructions and the like. Data or instructions stored within memory 18 are preferably accessed utilizing cache/memory interface 20 in manner well known to those having skill in the art. The sizing and utilization of cache memory systems is a well known subspeciality within the data processing art and is not addressed within the present application. However, those skilled in the art will appreciate that by utilizing modern associative cache techniques, a large percentage of memory accesses may be achieved utilizing data temporarily stored within cache/memory interface 20.

Instructions from cache/memory interface 20 are typically loaded into instruction dispatch 22 which preferably includes a plurality of queue positions. In a typical embodiment of a superscalar data processing system each position within the instruction dispatch may include between two and eight instructions and thus, in a given cycle, up to eight instructions may be loaded into instruction dispatch 22, depending upon how many valid instructions are passed by cache/memory interface 20 and how much space is available within instruction dispatch 22.

As is typical in such superscalar data processing systems, instruction dispatcher 22 is utilized to dispatch instructions to execution units 24. As depicted within FIG. 1, data processing system 10 may include one or more floating point units, fixed point processor units, load/store units, and a branch processor unit, as a matter of design choice. Thus, instruction dispatcher 22 may dispatch multiple instructions during a single cycle, one to each execution unit. Execution units may include reservation stations which could permit dispatch of more than one instruction to a single execution unit during a single cycle, as a matter of design choice. Thus, multiple execution units in a superscalar processor may each receive multiple instructions in a single cycle. Additionally, in multiprocessor systems instructions may be dispatched to multiple execution units 24 associated with multiple processors.

Figure 2:
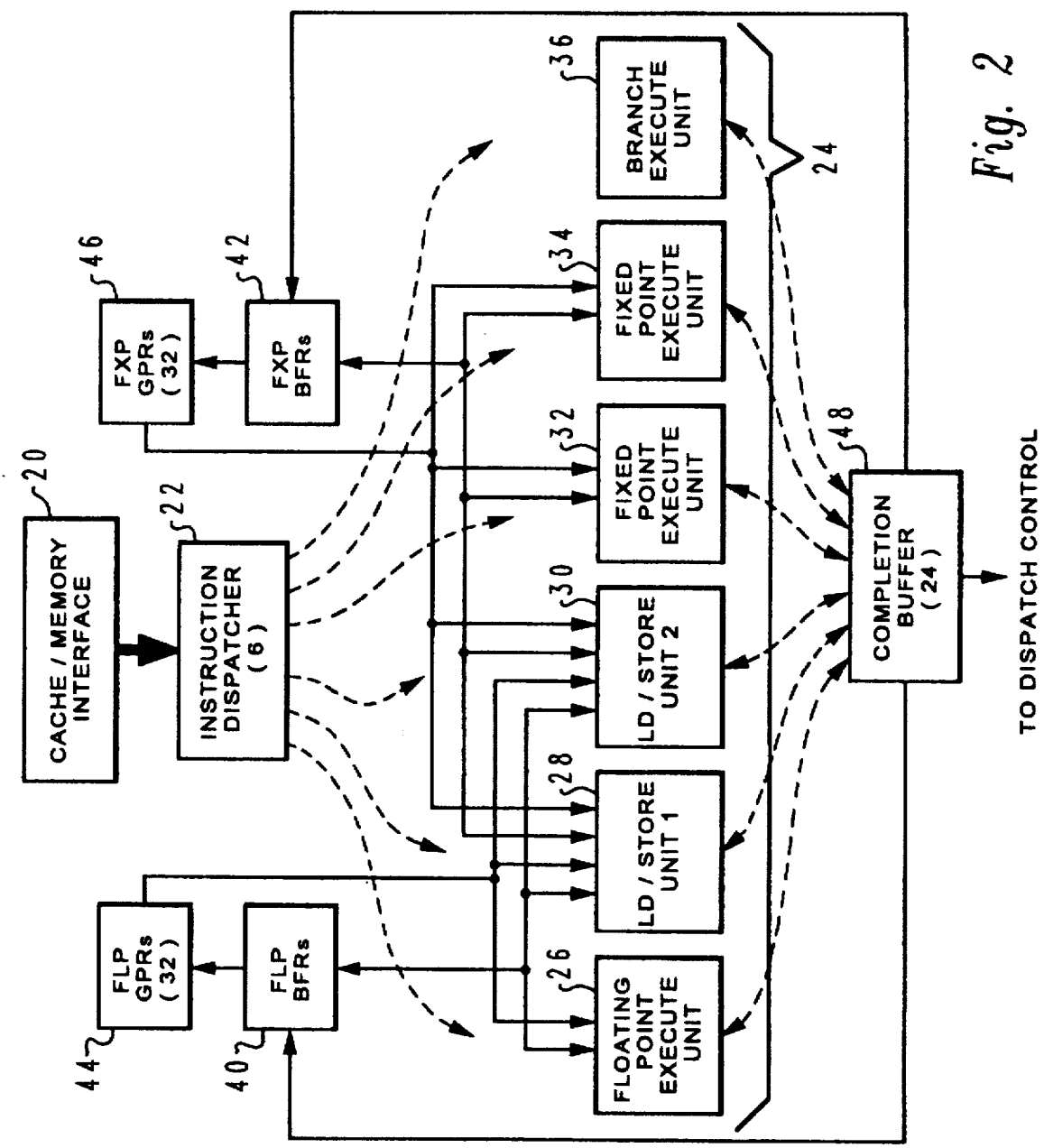
FIG. 2 is a more detailed block diagram of the instruction dispatch circuitry of the superscalar data processing system of FIG. 1 which may be utilized to implement the method and system of the present invention.

Referring now to FIG. 2, there is depicted a more detailed block diagram of the instruction dispatch circuitry of the superscalar data processing system of FIG. 1 which may be utilized to implement the method and system of the present invention. As illustrated, instructions from cache/memory interface 20 are typically loaded into instruction dispatcher 22 in groups in an application specified sequential order. Thus, as a matter of design choice, a group of two, four, or eight instructions are loaded from cache/memory interface 20 into instruction dispatcher 22, for dispatch on an opportunistic basis to one or more execution units within execution units 24. As depicted in the illustrated embodiment within FIG. 2, these execution units may include a floating point execution unit 26, multiple load/store units 28 and 30, multiple fixed point execution units 32 and 34, and a branch execution unit 36. Of course, as discussed above, a greater or lesser number of execution units of different types may be included within data processing system 10 as a matter of design choice.

As is typical in superscalar data processing systems such as the type depicted herein, a plurality of general purpose registers are also provided. In the depicted embodiment within FIG. 2, two groups of general purpose registers are provided. Floating point general purpose registers 44 and fixed point general purpose registers 46. Thus, the results of the execution of multiple instructions within the execution units depicted within FIG. 2 are typically stored within a selected general purpose register for future utilization. In accordance with an important feature of the present invention, a plurality of intermediate storage buffers are also provided. That is, floating point intermediate storage buffers 40 and fixed point intermediate storage buffers 42. As will be explained in greater detail herein, each execution unit is connected to each intermediate storage buffer via an independent bus. Thus, data required by an execution unit, or generated by the execution of an instruction within an execution unit, may be placed on an independent bus and stored within a designated intermediate storage buffer for utilization by other execution units or for future transfer to a general purpose register.

In this manner, the maintaining of complex lookup tables typically associated with register renaming scheme is not required and an intermediate storage buffer may be efficiently assigned to be immediately utilized as a storage location for a destination operand, permitting the instruction to be dispatched within a single processor cycle, since data locations do not need to be determined within a renamed register file. Additionally, the execution of instructions in a non-sequential manner may be permitted, with the output of those instructions being temporarily stored within intermediate storage buffers for future assembly within the general purpose registers in the application specified sequential order.

As depicted, the fixed point execution units are each coupled via an independent bus to fixed point intermediate storage buffers 42, while the floating point execution unit is connected to each floating point intermediate storage buffer 40, via an independent bus. Load/store units 28 and 30, as those skilled in the art will appreciate, are necessarily connected to floating point intermediate storage buffers 40 and fixed point intermediate storage buffers 42, since these units will load and store both fixed point and floating point data.

In accordance with another important feature of the present invention a completion buffer 48 is provided. Completion buffer 48 is utilized to track the completion of the multiple scalar instructions which are being executed within execution units 24. The results of the execution of these instructions, as described above, are each temporarily stored within an associated intermediate storage buffer and, upon an indication that an instruction or a group of instructions have been completed successfully, in an application specified sequential order, completion buffer 48 may be utilized to initiate the transfer of the results of those completed instructions data to the associated general purpose registers. Additionally, in the event an exception condition occurs, completion buffer 48 may be utilized to initiate storage of the results of the execution of any instruction which completed prior to the exception and to control instruction dispatcher 22 to restart the process at the point where the exception condition occurred, permitting corrupted or invalid data to be replaced by a valid output in an efficient manner, or to initiate a new sequence of instructions as specified by the application specific program for specific types of exceptions.

Figure 3:
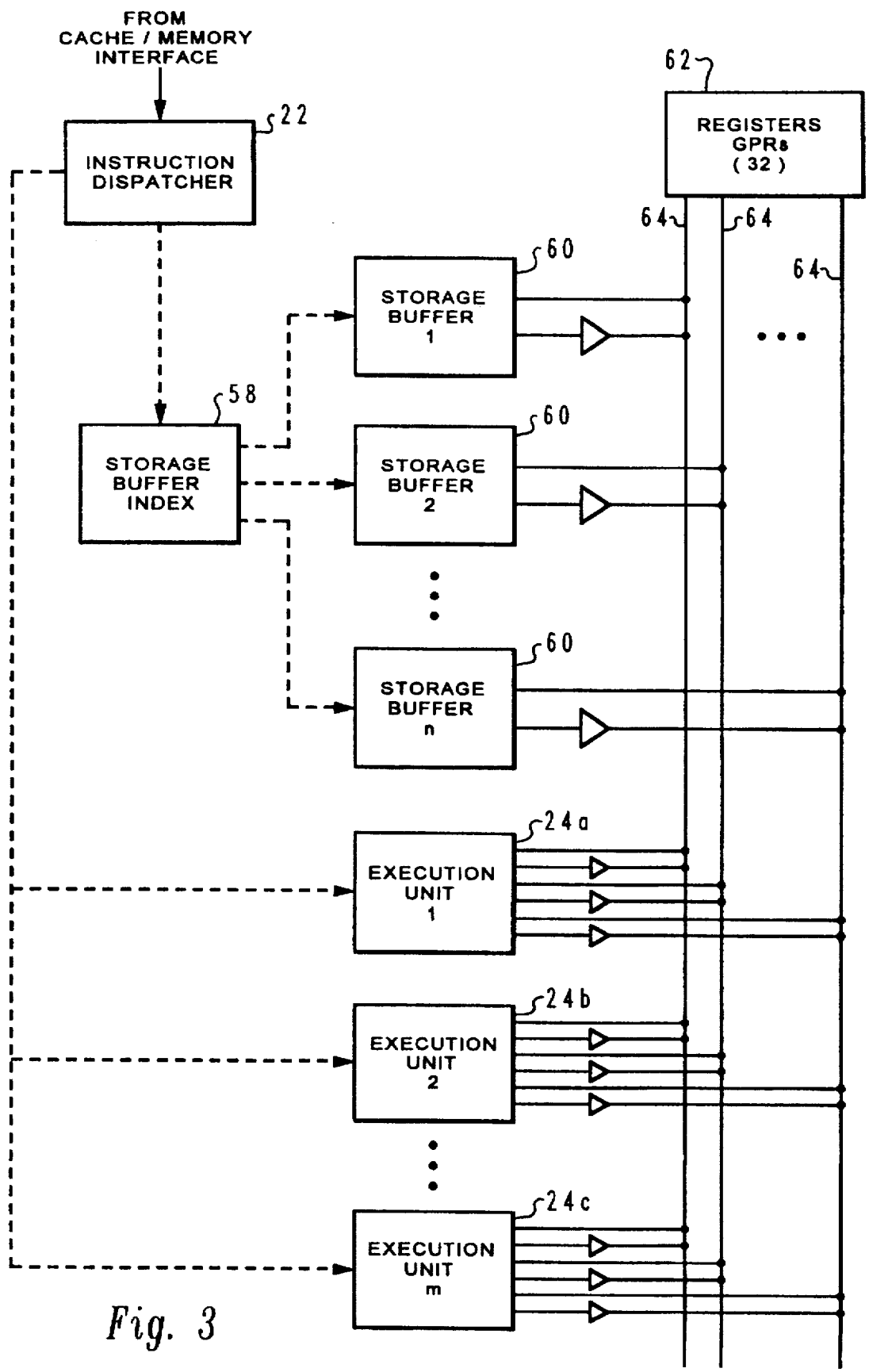
FIG. 3 is a high level block diagram which depicts the utilization of intermediate storage buffers within the superscalar data processing system of FIG. 1 in accordance with the method and system of the present invention.

With reference now to FIG. 3, there is depicted a high level block diagram illustrating the utilization of intermediate storage buffers within the superscalar processor system of FIG. 1, in accordance with the method and system of the present invention. A storage buffer index 58 is provided which is accessible by instruction dispatcher 22. As will be described in greater detail herein, storage buffer index 58 is utilized to store and maintain an indication of the relationship between each of a plurality of intermediate storage buffers 60 and a designated general purpose register 62 for utilization during execution of succeeding instructions.

The plurality of intermediate storage buffers 60 are preferably connected to multiple independent buses 64. In the preferred embodiment, the number of independent buses 64 equals the number of intermediate storage buffers 60, with each intermediate storage buffer connected to one bus. Each of the intermediate storage buffers 60 may read from and write to a corresponding independent bus 64. Those skilled in the art will recognize that the number of buses utilized may vary as a matter of design choice.

A plurality of execution units 24a, 24b, 24c depicted and are coupled to each of the multiple independent buses 64. In the preferred embodiment, execution units 24a, 24b, 24c may include a floating point execution unit, multiple load/store units, multiple fixed point execution units, and a branch execution unit. However, those skilled in the art will appreciate that the number and type of execution units may vary as a matter of design choice.

Each of the plurality of execution units 24a, 24b, 24c may also read from and write to each of the independent buses 64. Consequently, each of the plurality of execution units 24a, 24b, 24c are coupled to each of the plurality of intermediate storage buffers 60, via the multiple independent buses 64. Thus, when data is generated by the execution of an instruction within an execution unit, the execution unit may place that data on a bus corresponding to a designated intermediate storage buffer which has been specified as a destination for that data, where the data may be temporarily stored. At the same time, the execution unit indicates the data on the bus is valid by setting a "valid" bit to an appropriate state. In this manner, while the data is on the bus, and before or at the same time the data is stored within the designated intermediate storage buffer, any other execution unit which requires that data may retrieve the data from the bus. Thus, one advantage of the provision of independent buses is the elimination of the need to store the data in a buffer and then thereafter access that data from the buffer. The ability to retrieve data directly from the bus will significantly increase the operation speed of the processor system.

Still referring to FIG. 3, it may be seen that multiple independent buses 64 are each coupled to general purpose registers 62. When an instruction is to be dispatched to an execution unit, the relationship between the designated intermediate storage buffer and the selected general purpose register is preferably stored within the storage buffer index 58. When the results of execution are needed by another execution unit, the transfer of those results may be performed utilizing the information within storage buffer index 58. As will be discussed in greater detail herein, the information stored within storage buffer index 58 may be an identifier for the designated intermediate storage buffer which is accessed utilizing the general purpose register identification or an identifier of a general purpose register which is accessed with the identification of the designated intermediate storage buffer.

In this manner, the maintenance of complex lookup tables typically associated with a register renaming scheme is not required, since an intermediate storage buffer may be immediately assigned as a storage location for each destination operand within an instruction to be dispatched, without requiring the renaming of a general purpose register file. Furthermore, storage buffer index 58 permits the execution of instructions in a non-sequential manner, since the results of execution of each instruction are temporarily stored in intermediate storage buffers 60, and may be subsequently utilized by a succeeding instruction by utilizing the information within storage buffer index 58 and the content of completion buffer 48 (see FIG. 2).

An instruction is considered finished when the results of the instruction are stored in a buffer. Completion of an instruction occurs when the data stored in the buffer are transferred to a general purpose register (GPR).

Figure 4:
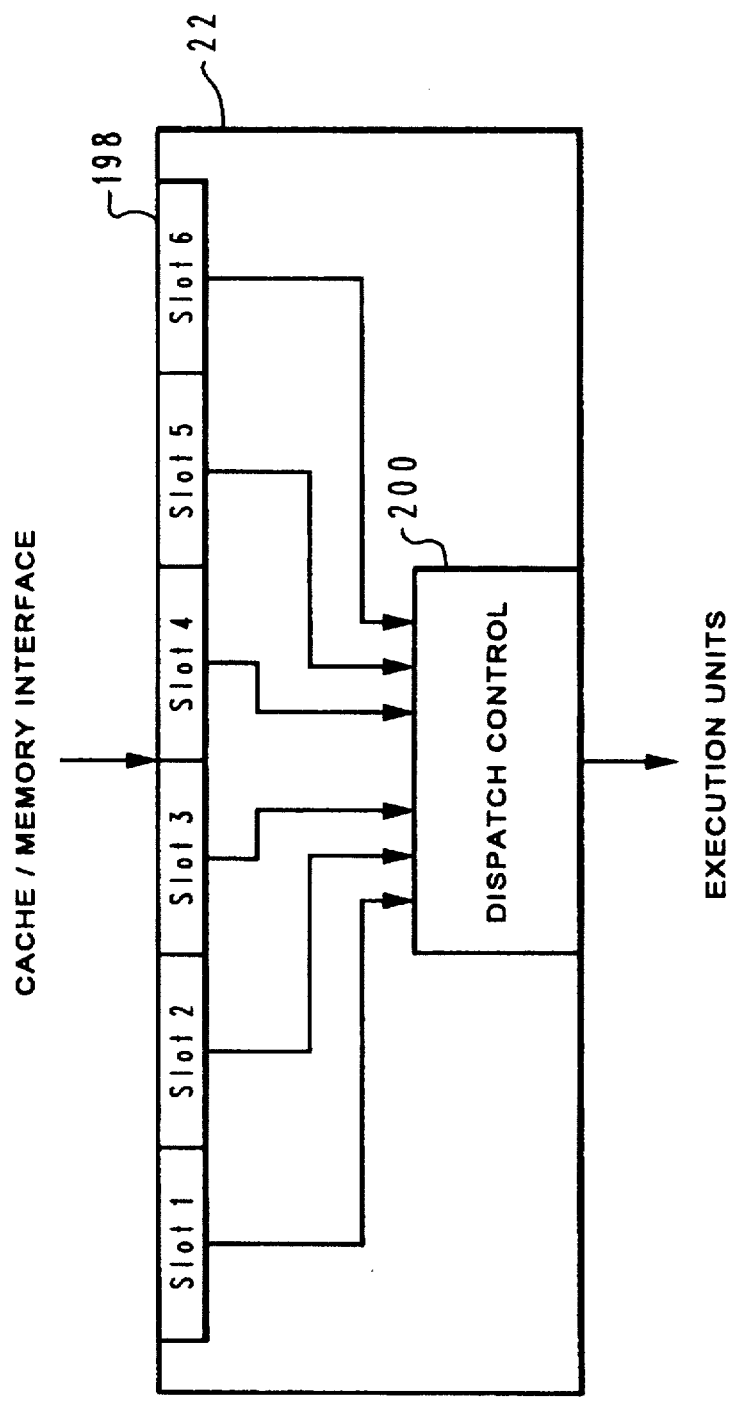
FIG. 4 is a block diagram illustrating an instruction dispatcher in accordance with a preferred embodiment of the present invention.

With reference to FIG. 4, a block diagram illustrating an instruction dispatcher is depicted in accordance with a preferred embodiment of the present invention. Instruction dispatcher 22 includes instruction dispatch buffer 198 having slots 1–6 in accordance with a preferred embodiment of the present invention. Although the depicted embodiment utilizes 6 slots, other numbers of slots may be utilized in accordance with a preferred embodiment of the present invention. Instructions are fetched and loaded into the slots for dispatching. These instructions are fetched in an application specified ordered sequence. In accordance with a preferred embodiment of the present invention, the slots are loaded such that the first instruction in the sequence fetched is placed into slot 1, the second into slot 2, third into slot 3, etc. Other schemes for fetching and placing instructions into the slots may be implemented by those skilled in the art other than the depicted scheme in accordance with a preferred embodiment of the present invention. Dispatch control 200 determines when to dispatch instructions, which instructions to dispatch, and what execution units the instructions should be sent to. Typically, instructions are dispatched simultaneously from the slots in an opportunistic basis; no particular sequence must be followed in dispatching instructions.

Some of the instructions may include flags or indicators identifying a requirement for serialization of instruction processing, also called serialization. Other times, serialization may be indicated to dispatch control 200 by a signal from completion buffer 48 in accordance with a preferred embodiment of the present invention.

Completion buffer 48 along with dispatch control 200 may control various types of serialization. Serialization is required whenever an instruction uses or changes an architected facility, which is not renamed, and in some synchronization cases. Different types of serialization or serial processing may be utilized depending on the instruction or situation. For example, Load Multiple (LM) and Store Multiple (STM) are instructions that may use or change up to 32 GPRs. In the case of LM, which loads registers, it would be unreasonable to rename 32 registers. An efficient solution is to serialize the processing of instructions. In accordance with a preferred embodiment of the present invention, all instructions before LM must be completed before LM starts loading to ensure that the GPRs contains the correct data after completion of the LM. Instructions after LM cannot be dispatched until LM is completed to ensure that these instructions are dispatched with correct data. This type of serialization is called "general serialization".

Serialization at execution, "execution serialization", is required for instructions that set and utilize certain architected bits. STM causes the contents of GPRs to be placed into memory. The data from up to 32 registers normally cannot be reasonably dispatched with the store instruction as is done for most instructions. Execution serialization may be utilized with STM. The STM starts execution after data from previous instructions has been placed into GPRs. Instructions following the STM may be dispatched and executed, but wait for completion until data has been removed from the GPRs to ensure that the GPRs are not over-written too soon.

A storage synchronization instruction requires that all storage references before the storage synchronization instruction be completed before any storage reference after the instruction. Another type of storage synchronization instruction may require loads and stores following the instruction to be delayed until all instructions before the storage synchronization instruction are completed. Other types of storage instructions known to those skilled in the art also may require storage synchronization serialization.

Basically instructions within the buffers of the instruction dispatcher are first decoded to determine which, if any, serialization applies to each instruction. Other information also is decoded from each instruction, such as, execute unit type required, type of reorder registers required, etc.

Figure 5A:
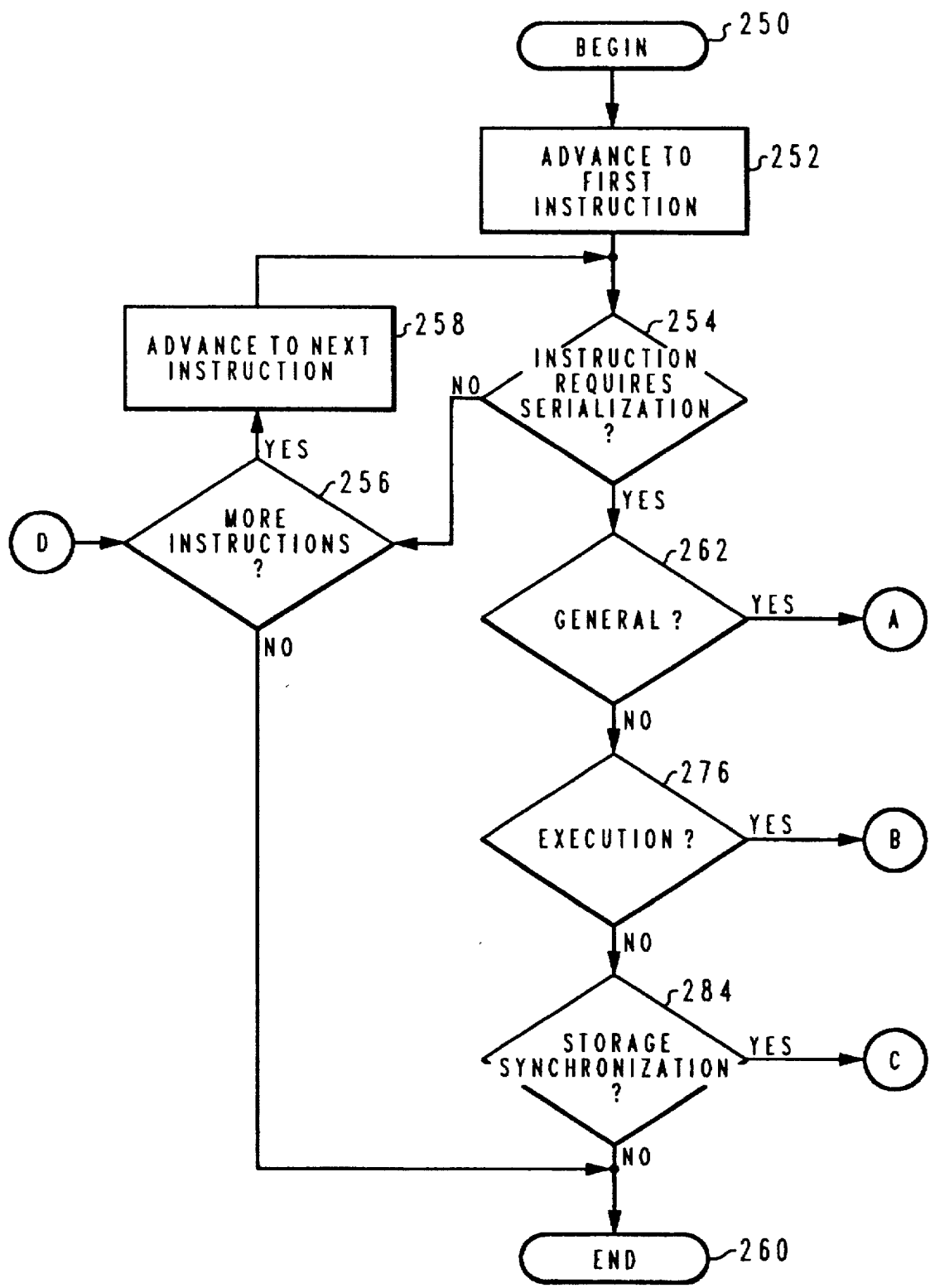
FIGS. 5A–C depict a method and system for processing instructions requiring serialization in accordance with a preferred embodiment of the present invention.
Figure 5B:
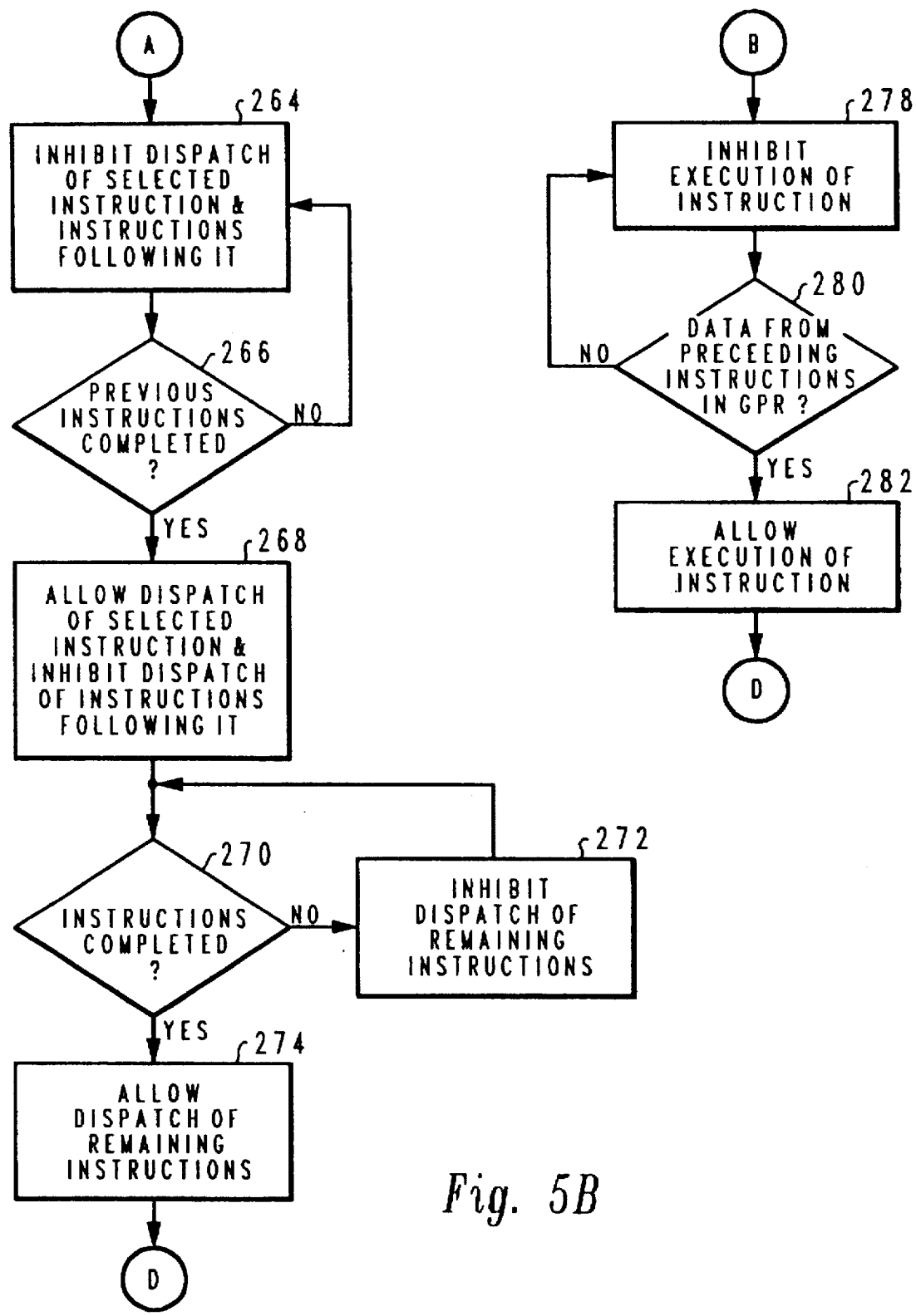
Figure 5C:
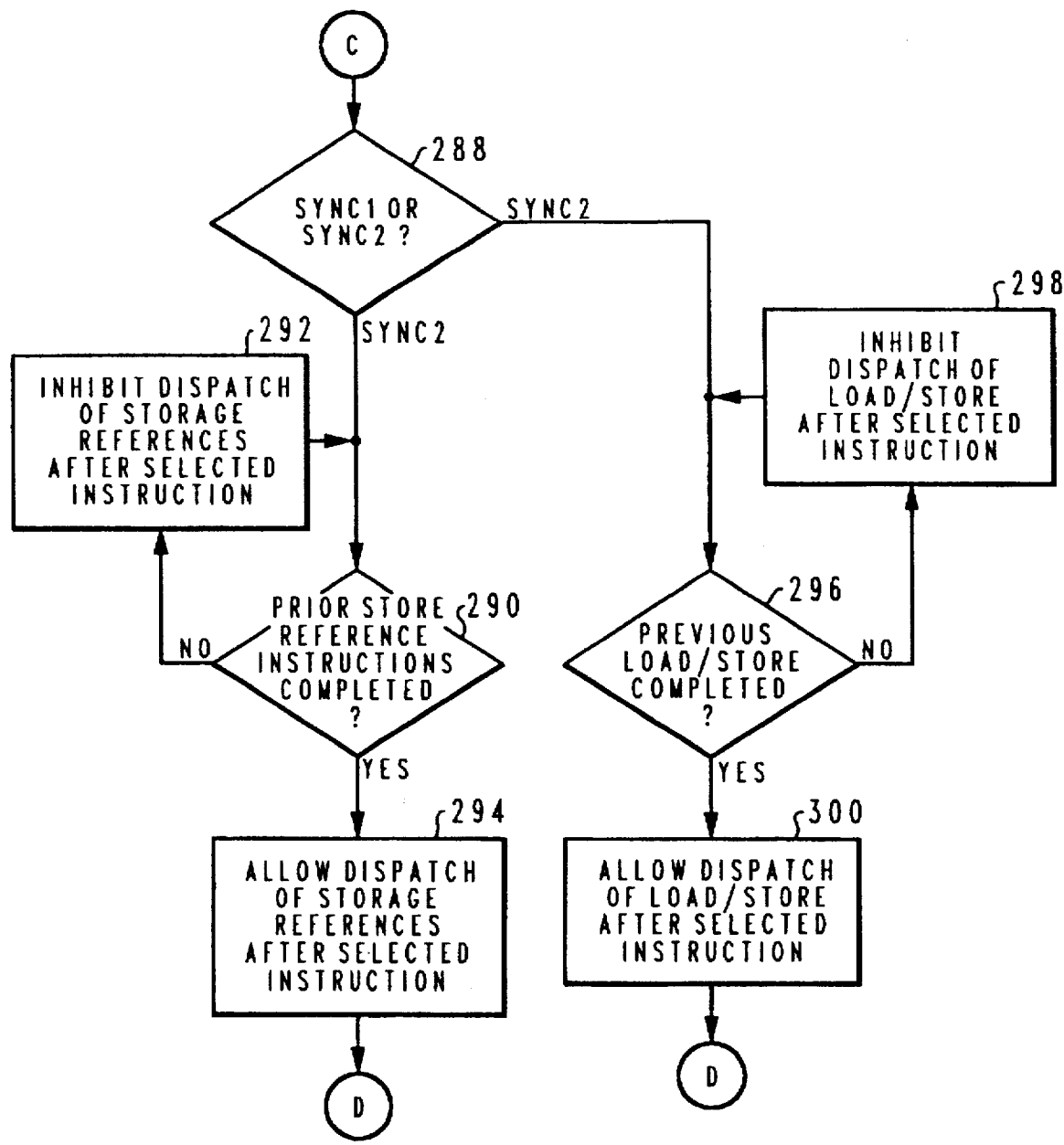

Referring now to FIGS. 5A–5C, a high level flowchart illustrating a method and system for processing instructions requiring serialization in accordance with a preferred embodiment of the present invention is depicted. The process begins in block 250 and thereafter proceeds to block 252. Block 252 illustrates advancing to the first instruction in slot I in accordance with a preferred embodiment of the present invention. The process then advances to block 254, which depicts a determination of whether or not the selected instruction requires serialization. If the selected instruction does not require serialization, the process proceeds to block 256, which illustrates a determination of whether or not more instructions exist for examination. If more instructions are present, the process then proceeds to block 258. Block 258 depicts the advancement to the next instruction, which becomes the selected instruction. The process then returns to block 254. Referring back to block 256, if more instructions are not present, the process terminates as illustrated in block 260.

Referring back to block 254, if the selected instruction requires serialization, the process passes to block 262, which illustrates a determination of whether or not the selected instruction requires general serialization. If the selected instruction requires general serialization, the process proceeds to block 264 in FIG. 5B, via connector A. Block 264 depicts the inhibition of the dispatching of the selected instruction and instructions following it. Next, the process passes to block 266, which illustrates a determination of whether or not previous instructions prior to the instruction have been completed. If previous instructions have not been completed, the process returns to block 264.

Completion of previous instructions causes the process to pass to block 268, which depicts allowing the dispatch of the selected instruction and continuing to inhibit the dispatch of the instructions following the selected instruction. The process then proceeds to block 270. Block 270 illustrates a determination of whether or not the selected instruction has been completed. If the selected instruction has not been completed, the process proceeds to block 272, which depicts continuing to inhibit the dispatch of the remaining instructions following the completion of the selected instruction. Thereafter, the process returns to block 270. Completion of the selected instruction results in the process proceeding to block 274. Block 274 illustrates allowing the dispatch of the remaining instructions with the process returning to block 256 in FIG. 5A, via connector D.

Referring back to block 262, if the selected instruction does not require general serialization, the process then proceeds to block 276. Block 276 depicts a determination of whether or not execution serialization is required by the selected instruction. If execution serialization is required, the process proceeds to block 278 in FIG. 5B, via connector B. Block 278 illustrates the inhibiting of the execution of the selected instruction. Although the selected instruction is not executed, the instruction may be dispatched so that various items, such as, for example addresses may be calculated. Thereafter, the process proceeds to block 280, which depicts a determination of whether or not data from the instructions preceding the selected instruction is in the GPR. If data from the instructions preceding the selected instruction is not in the GPR, the process returns to block 278. The presence of data from all of the preceding instructions in the GPR results in the process passing to block 282. Block 282 illustrates allowing the execution of the selected instruction. Afterward, the process returns to block 256, via connector D.

Referring back to block 276, if the instruction does not require execution serialization, the process then proceeds to block 284. Block 284 illustrates a determination of whether or not the instruction requires storage synchronization. Generally, storage synchronization may be controlled by preventing the dispatch of load and store instructions or also by preventing completion of execution by load and store units. If the instruction requires storage synchronization, the process then proceeds to block 288 in FIG. 5C, via connector C. Block 288 illustrates a determination of whether or not the selected instruction is a sync 1 instruction or a sync 2 instruction in accordance with a preferred embodiment of the present invention. If the selected instruction is a sync 1 instruction, the process then proceeds to block 290. Block 290 depicts a determination of whether or not all storage references prior to the selected instruction have been completed.

If prior storage references located before the selected instruction according to the application specific order have not been completed, the process then proceeds to block 292, which depicts inhibiting the dispatch of any storage references after the selected instruction. Thereafter the process returns to block 290. Referring back to block 290, if the storage references prior to the selected instruction have been completed, the process then proceeds to block 294. Block 294 illustrates allowing the dispatch of the storage references occurring after the selected instruction. Thereafter, the process returns to block 256, via connector D.

Referring back to block 288, if the selected instruction is a sync 2 instruction, the process then proceeds to block 296. Block 296 illustrates a determination of whether or not all instructions prior to the selected instruction have been completed. If all of the instructions prior to the selected instruction have not been completed, the process then proceeds to block 298. Block 298 depicts inhibiting the dispatch of all load and store instructions located after the selected instruction according to the application specific order. Thereafter, the process returns to block 296. Upon the completion of all instructions occurring prior to the selected instruction, the process then proceeds to block 300, which illustrates allowing the dispatch of load and store instructions occurring after the selected instruction according to the application specific order. Thereafter, the process returns to block 256, via connector D. The depicted embodiment illustrates two types of instructions requiring storage synchronization. Those skilled in the art will realize that other types of instructions requiring storage synchronization may also be serialized in accordance with a preferred embodiment of the present invention.

Figure 5D:
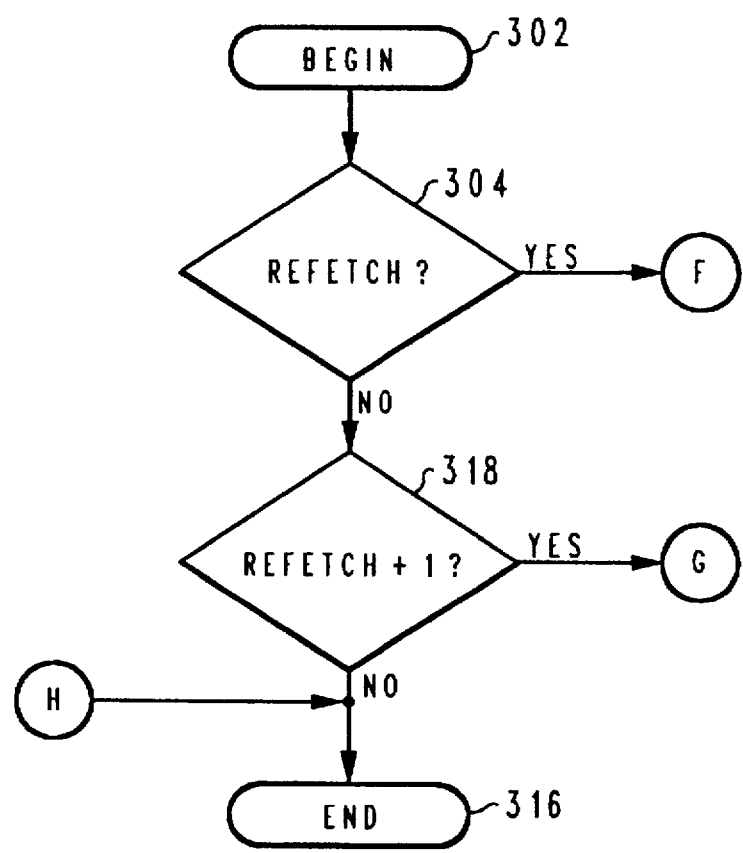
FIGS. 5D and 5E illustrate a method and system for refetch and refetch+1 serialization in accordance with a preferred embodiment of the present invention.
Figure 5E:
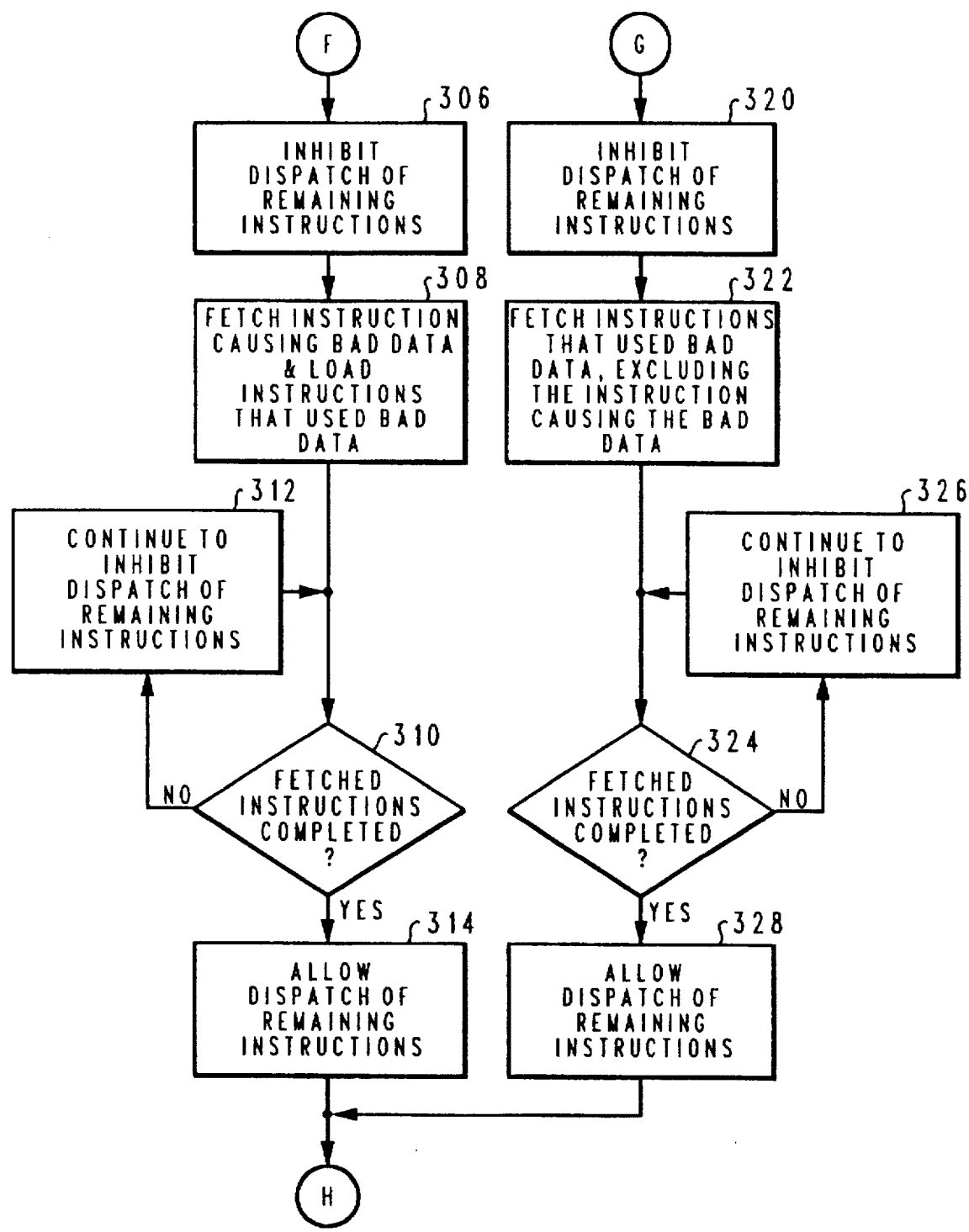

Referring now to FIGS. 5D and 5E, a flowchart illustrating a method and system for refetch and refetch+1 serialization is depicted in accordance with a preferred embodiment of the present invention. Refetch or refetch+1 serialization is typically required when an instruction causes an error resulting in bad data. The instruction causing the bad data may need to be refetched and redispatched for proper processing. Furthermore, other instructions utilizing the bad data also may need to be refetched and redispatched in accordance with a preferred embodiment of the present invention. Instructions within this category include those that change registers related to load/store control (i.e., TID, SRD). Some floating point instructions also may fall into this category when the floating point instruction causes an exception that requires the destination of the floating point register to remain unchanged. This situation may occur if a load following some earlier store has been executed when it is discovered that the contents of the load address may have been changed by an earlier store. The load instruction and everything after it must be re-fetched, re-dispatched, and re-executed to ensure that correct data is utilized.

Errors may be discovered in the completion buffer utilizing unique ID numbers as described in "Method and System For Tracking Instructions With a Superscalar Processor System", U.S. patent application Ser. No. 08/001,866, now abandoned. Utilizing unique identification numbers, instructions that have cause or utilize bad data may be detected.

Refetch serialization causes an instruction or set of instructions to be refetched and redispatched. Instructions not yet dispatched are inhibited until the instruction or instructions are redispatched. Refetch+1 serialization is similar to refetch serialization except the instruction after the serializing instruction is selected for refetching and reexecution.

The process begins as illustrated in block 302. Thereafter, the process proceeds to block 304, which depicts a determination of whether or not refetch serialization is required. If refetch serialization is required, the process then proceeds to block 306 in FIG. 5E, via connector F. Block 306 illustrates inhibiting the dispatch of instructions remaining in the dispatch buffers. The process then proceeds to block 308. Block 308 depicts fetching the instruction that caused bad data and loading the instructions that used the bad data into the dispatch controller. Thereafter, the process proceeds to block 310. Block 310 illustrates a determination of whether or not the fetched instructions have been completed. If the fetched instructions have not been completed, the process proceeds to block 312, which depicts continuing to inhibit the dispatching of the remaining instructions. The process then returns to block 310 upon the completion of the fetched instructions, the process then proceeds to block 314. Block 314 illustrates allowing the dispatch of the remaining instructions.

Afterward, the process terminates in block 316 in FIG. 5D. Referring back to block 304, if refetch serialization is not required the process then proceeds to block 318, which illustrates a determination of whether or not refetch+1 serialization is required. If refetch+1 serialization is required, the process then proceeds to block 320, via connector G. Block 320 illustrates inhibiting the dispatch of the remaining instructions in the dispatch controller. Thereafter, the process proceeds to block 322, which depicts fetching the instructions that used bad data, excluding the instruction causing the bad data. Afterward, the process proceeds to block 324, which illustrates a determination of whether or not the fetched instructions have been completed. If the fetched instructions have not been completed, the process proceeds to block 326, which depicts continuing to inhibit the dispatch of the remaining instructions. Upon completion of the fetched instructions, the process passes to block 328. Block 328 depicts allowing the dispatch of the remaining instructions. Thereafter, the process terminates in block 316.

While the invention has been particularly shown and described with reference to a preferred embodiment, it will be understood by those skilled in the art that various changes in form and detail may be made therein without departing from the spirit and scope of the invention.

We claim:

1. A method for enhanced instruction dispatch efficiency in a superscalar processor system capable of fetching an application specified ordered sequence of scalar instructions and simultaneously dispatching a group of said scalar instructions to a plurality of execution units on a nonsequential opportunistic basis, said method comprising:

processing a group of scalar instructions fetched in an application specified ordered sequence on a nonsequential opportunistic basis;

detecting a condition requiring serialization during said processing step; and in response to a detection of a condition requiring serialization, selectively controlling processing of particular ones of said group of scalar instructions, wherein at least a portion of said group of scalar instructions are thereafter processed in a serial fashion, wherein said step of detecting a condition requiring serialization during said processing step comprises detecting a condition requiring reprocessing of at least one finished scalar instruction, wherein said condition is caused by a particular instruction.

2. The method for enhanced instruction dispatch efficiency in a superscalar processor system according to claim 1, wherein said step of selectively controlling processing of particular ones of said group of scalar instructions comprises:

refetching all finished scalar instructions utilizing data resulting from said condition requiring reprocessing of at least one finished scalar instruction; and selectively controlling processing of processing all refetched scalar instructions.

3. The method for enhanced instruction dispatch efficiency in a superscalar processor system according to claim 1 further comprising refetching said instruction causing said condition requiring reprocessing of at least one finished scalar instruction.

4. A system for enhanced instruction dispatch efficiency in a superscalar processor system capable of fetching an application specified ordered sequence of scalar instructions and simultaneously dispatching a group of said scalar instructions to a plurality of execution units on a nonsequential opportunistic basis, said system comprising:

processing means for processing a group of scalar instructions fetched in an application specified ordered sequence on a nonsequential opportunistic basis;

detection means for detecting a condition requiring serialization during said processing step; and in response to a detection of a condition requiring serialization, control means for selectively controlling processing of particular ones of said group of scalar instructions, wherein said control means for selectively controlling processing of particular ones of said group of scalar instructions comprises:

refetch means for refetching all finished scalar instructions utilizing data resulting from said condition requiring reprocessing of at least one finished scalar instruction; and selective control means for selectively controlling processing of processing all refetched scalar instructions, wherein at least a portion of said group of scalar instructions are thereafter processed in a serial fashion, wherein said detection means for detecting a condition requiring serialization during said processing step comprises means for detecting a condition requiring reprocessing of at least one finished scalar instruction, wherein said condition is caused by a particular instruction.

5. A system for enhanced instruction dispatch efficiency in a superscalar processor system capable of fetching an application specified ordered sequence of scalar instructions and simultaneously dispatching a group of said scalar instructions to a plurality of execution units on a nonsequential opportunistic basis, said system comprising:

processing means for processing a group of scalar instructions fetched in an application specified ordered sequence on a nonsequential opportunistic basis;

detection means for detecting a condition requiring serialization during said processing step;

in response to a detection of a condition requiring serialization, control means for selectively controlling processing of particular ones of said group of scalar instructions, wherein at least a portion of said group of scalar instructions are thereafter processed in a serial fashion, wherein said detection means for detecting a condition requiring serialization during said processing step comprises means for detecting a condition requiring reprocessing of at least one finished scalar instruction, wherein said condition is caused by a particular instruction; and refetch means for refetching said instruction causing said condition requiring reprocessing of at least one finished scalar instruction.

6. A method for enhanced processing of instructions in a superscalar processor system capable of fetching an application specified ordered sequence of scalar instructions and simultaneously dispatching a group of said scalar instructions through a plurality of execution units on a nonsequential opportunistic basis, said method comprising:

executing a group of scalar instructions within said plurality of execution units;

detecting an instruction requiring serialization during said execution step, wherein said instruction requires a reexecution of said instruction;

inhibiting dispatch of remaining instructions within said dispatch buffers;

fetching said instruction requiring reexecution and loading instructions affected by said instruction;

determining whether fetched instructions have been completed; and allowing dispatch of remaining instructions in said dispatch buffers responsive to a determination that fetched instructions have been completed, otherwise continuing to inhibit dispatch of remaining instructions.

7. The method of claim 6 further comprising:

responsive to a determination that the instruction requires a refetch plus one serialization, inhibiting dispatch of remaining instructions in said dispatch buffer;

fetching instructions affected by the instruction;

determining whether said fetched instructions have been completed; and allowing dispatch of remaining instructions in response to a determination that said fetched instructions have been completed, otherwise continuing to inhibit dispatch of remaining instructions in said dispatch buffers.

8. A method for enhanced processing of instructions in a superscalar processor system capable of fetching an application specified ordered sequence of scalar instructions and simultaneously dispatching a group of said scalar instructions through a plurality of execution units on a nonsequential opportunistic basis, said method comprising:

executing a group of scalar instructions within said plurality of execution units;

detecting an instruction requiring serialization during said execution step, wherein said instruction requires a reexecution of said instruction;

inhibiting dispatch of remaining instructions within said dispatch buffers;

fetching said instruction requiring reexecution and loading instructions affected by said instruction;

determining whether fetched instructions have been completed;

allowing dispatch of remaining instructions in said dispatch buffers responsive to a determination that fetched instructions have been completed, otherwise continuing to inhibit dispatch of remaining instructions;

responsive to a determination that the instruction requires a refetch plus one serialization, means for inhibiting dispatch of remaining instructions in said dispatch buffer;

means for fetching instructions affected by the instruction;

means for determining whether said fetched instructions have been completed; and means for allowing dispatch of remaining instructions in response to a determination that said fetched instructions have been completed, otherwise continuing to inhibit dispatch of remaining instructions in said dispatch buffers.

* * * * *